ated April 23, 1908. Serial No. 428,820.

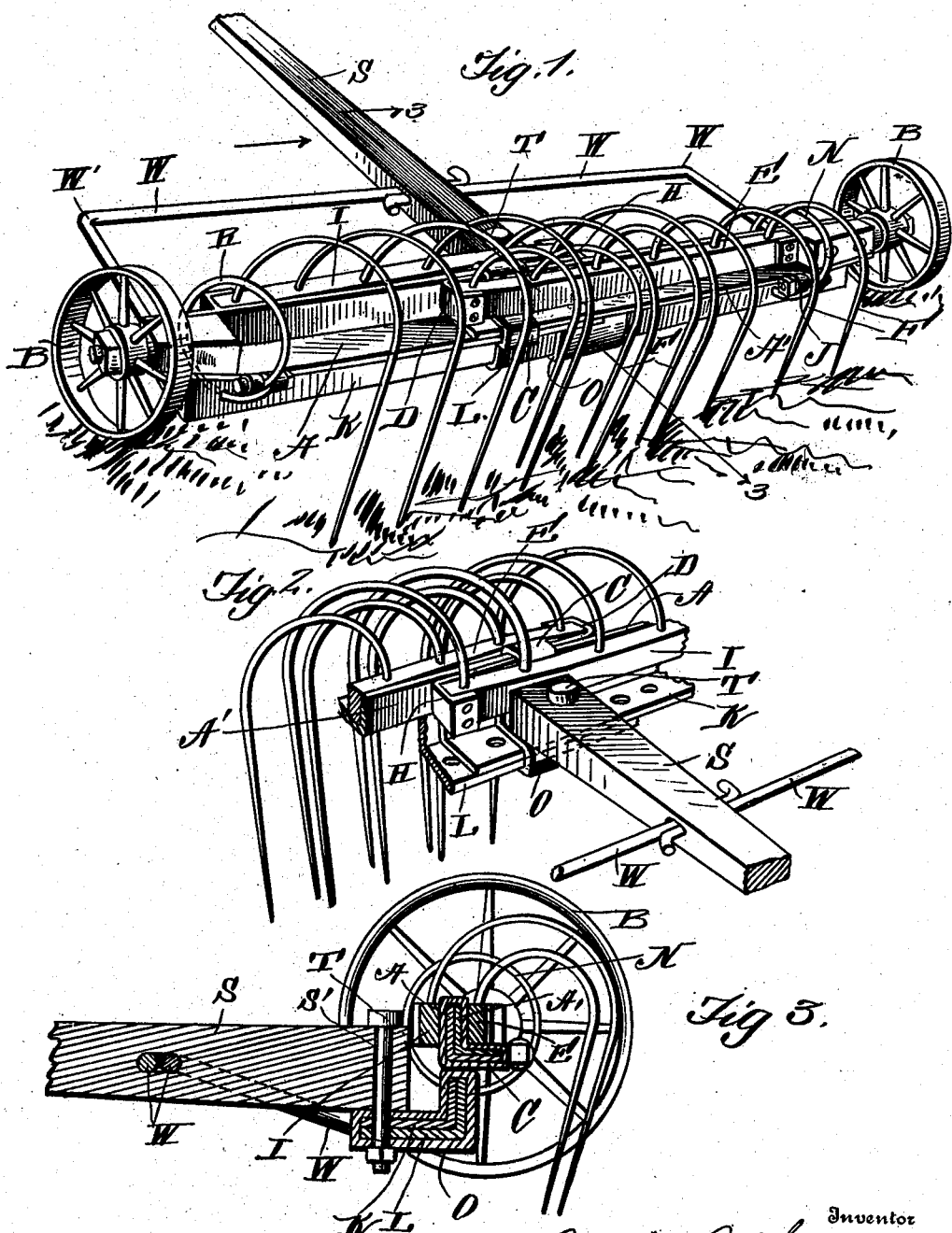

UNITED STATES PATENT OFFICE.

JULIUS J. HOLLEY, OF HOLMEN, WISCONSIN.

ADJUSTABLE RAKE.

No. 899,982. Specification of Letters Patent. Patented Sept. 29, 1908.

Application filed April 23, 1908. Serial No. 428,820.

*To all whom it may concern:*

Be it known that I, JULIUS J. HOLLEY, a citizen of the United States, residing at Holmen, in the county of La Crosse and State of Wisconsin, have invented certain new and useful Improvements in Adjustable Rakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable rakes, the object in view being to produce a simple and efficient apparatus of this nature, in which the axle is made up of two sliding sections and so arranged that they may be extended or contracted for bringing the wheels farther apart or nearer together.

The invention comprises various details of construction, combinations and arrangements of parts which will be hereinafter fully described and then specifically defined in the appended claims.

My invention is illustrated in the accompanying drawings, in which:—

Figure 1 is a perspective view of my adjustable rake. Fig. 2 is an enlarged side elevation of the adjustable axle sections, and Fig. 3 is a cross sectional view on line 3—3 of Fig. 1.

Reference now being had to the details of the drawings by letter, A and A' designate two axle sections made of any suitable material, such as angle iron, and to the outer end of each section is journaled a wheel B. Said section A has a strap C thereon through which the flange of the section A' passes, and the inner end of the axle section A' is bent to form a stop D, against which a bar E bears which latter carries the rake teeth F. Said bar is held to the axle section in any suitable manner. One section of A of the axle has its inner end bent to form a stop H, and I designates a bar similar to the bar E above described and which is held to the section A by bolts or other suitable means.

K and L designate two adjustable draw bars which, in the present instance, are shown made of angle iron and adapted to slide one over the other and a strap O surrounds the two sections K and L and holds the same together, allowing them to slide longitudinally with the sections of the axle. The bar K is held to the axle section A' by means of the ring N connected to a thill coupling J, and R designates a similar ring which holds the axle L to the section A, causing the two axle sections and bars to move together as they are extended or closed. A shaft S has an aperture S' therein adapted to receive a pin T passed through registering apertures in said bars K and L and the strap which surrounds the same, thereby holding the sections in adjusted positions. A rod W is fastened to the outer end of the two sections K and L and is bent at an angle at W' and their inner ends are passed through apertures in the shaft S through which they are guided as the sections are extended or closed.

From the foregoing, it will be noted that, by the provision of the apparatus shown and described, a simple and efficient means is afforded whereby the length of the rake may be reduced for convenience when coming to a narrow way and also for convenience in storage purposes.

What I claim to be new is:—

1. An adjustable rake made up of two sliding axle sections, a bar fixed to each section and having rake teeth thereon, stops at the inner ends of said sections against which said bars are adapted to contact, and adjustable bars fastened to said axle sections, as set forth.

2. An adjustable rake comprising two axle sections, a strap for holding the same together, the inner end of each section forming a stop, a bar fixed to each section and having rake teeth thereon, and adjustable draw bars connected to said sections, as set forth.

3. An adjustable rake comprising two axle sections, a strap for holding the same together, the inner end of each section forming a stop, a bar fixed to each section and having rake teeth thereon, each of said axle sections having a thill coupling thereon, draw bars adjustable longitudinally and each connected to said coupling, and a shaft fastened to said draw bars, as set forth.

4. An adjustable rake comprising two axle sections, a strap for holding the same together, the inner end of each section forming a stop, a bar fixed to each section and having rake teeth thereon, each of said axle sections having a thill coupling thereon, draw bars adjustable longitudinally and each connected to said coupling, a shaft fastened to said draw bars, a rod fastened to each of said draw bars, bent at an angle and passing through said shaft, as set forth.

In testimony whereof I hereunto affix my signature in the presence of two witnesses.

JULIUS J. HOLLEY.

Witnesses:
C. B. SLETTELAND,
P. A. SJOLANDER.